United States Patent [19]

Pera

[11] 3,826,990

[45] July 30, 1974

[54] ANTI PHASE-AMBIGUITY FOR PHASE-SHIFT KEYING BINARY TRANSMISSION SYSTEMS

[75] Inventor: Luigi Pera, Oegstgeest, Netherlands

[73] Assignee: Organization Europeenne de Recherches Spatiales, Neuilly-sur-Seine, France

[22] Filed: Jan. 26, 1973

[21] Appl. No.: 327,112

[30] Foreign Application Priority Data

Jan. 28, 1972 Belgium .............................. 113349

[52] U.S. Cl. ..................... 329/50, 178/88, 325/320, 328/133, 329/104

[51] Int. Cl. ............................................ H03d 3/18

[58] Field of Search ...... 329/50, 104; 328/133, 134; 325/320; 178/66 R, 88

[56] References Cited

UNITED STATES PATENTS 3,376,514 4/1968 Womack et al................ 325/320 X 3,667,050 5/1972 Gibson................................. 178/88

*Primary Examiner*—Alfred L. Brody

*Attorney, Agent, or Firm*—Charles F. Duffield

[57] ABSTRACT

A circuit arrangement to eliminate the phase ambiguity at a receive terminal in phase-shift keying binary transmission systems. The received PSK binary signal is simultaneously applied to a conventional synchronous demodulator and a so-called non-ambiguous demodulator which may be in analog or digital form. The outputs from both demodulators are compared to provide a signal having a first state when both demodulator outputs are in phase and having a second state when said demodulator outputs are in phase opposition. Logic means are provided to detect the state of the comparison signal in order to control inverter means adapted to reverse the demodulated original message from the synchronous demodulator when said comparison signal is in its second state.

5 Claims, 6 Drawing Figures

ANTI PHASE-AMBIGUITY FOR PHASE-SHIFT KEYING BINARY TRANSMISSION SYSTEMS

BACKGROUND OF THE INVENTION

The present invention relates to a circuit arrangement to eliminate the phase ambiguity at a receive terminal in phase-shift keying binary transmission systems.

In these transmission systems or PSK systems, the carrier has to be reconstructed at the receive terminal to demodulate the transmitted signal for information recovery. The carrier regeneration techniques do not prevent 180° phase ambiguity since the reconstructed carrier can have the same phase as the actual carrier or the reverse phase. It is thus necessary to eliminate this phase ambiguity in order that synchronous demodulation of the received signal produces the original information and not the complement thereof.

The known methods to eliminate this phase ambiguity use a so-called MARK code or are based on the knowledge of some part of the transmitted message.

In the first approach the received binary signal is coded such that each transition represent a 1 in the original message and the absence of transition represent a 0 in the message. This approach is simple indeed but it has several drawbacks as follows:

*a.* the bit-error rate is doubled since a single bit error in the detection process causes two consecutive bits in error to appear after decoding; this results in a loss of performance which can often be significant;

*b.* the bit errors appear in groups of two, and consequently special codes such as self-checking codes cannot be used.

In the second approach a determined code is included in the transmitted binary message. At the receive terminal this code from the received message is compared bit for bit with a reference code to decide whether the received message is correct or reversed. This approach has the drawback that some space in the transmitted format has to be used for the code, thereby reducing the space available for the useful information to be transmitted. Furthermore, the average response time of such a system is long since after an inversion has occurred in the message, one has to wait until reception of the next code.

SUMMARY OF THE INVENTION

The object of the invention is an anti-ambiguity arrangement characterized by a short response time and not requiring space in the message format to be assigned to some known code.

The arrangement of the invention comprises a conventional synchronous demodulator having a carrier regenerating circuit means associated thereto, as known per se. This demodulator derives the original message from the received binary signal in a well known manner. A so-called non-ambiguous demodulator also accepts the incoming binary signal to reproduce the original message. This second demodulator may have less precisely defined performance and especially an output signal-to-noise ratio substantially less than is usually required for a conventional demodulator. The outputs from both demodulators are coupled to distinct inputs of comparator means which produces a signal having a first state when both inputs thereto are in phase and a second state when said inputs are in phase opposition. Logic means connected at the comparator output detects the state of the output signal thereof to produce a control signal where said output signal has its second state. The control signal operates an inverter means connected at the output of the synchronous demodulator to reverse the demodulated signal therefrom, i.e., the recovered original message, in response to said control signal.

According to the invention, the second demodulator comprises delay means to accept the incoming binary signal at a first input thereof and a signal having a frequency equal to twice the carrier frequency at a second input thereof to provide a delay equal to half the carrier period, and adder means followed by store means. A first input of said adder means accepts the incoming binary signal and the second input thereof accepts the output signal from said delay means. The adder couples to said store means a pulse having a first state when both input signals have a same first state, a pulse having a second state when both input signals have a same second state, and no pulse when the two input signals have different states. Said store means retains the state of a pulse applied to any one of the inputs thereof until the occurrence of a next pulse. This second demodulator can be designed in analog or in digital form.

DETAILED DESCRIPTION OF THE INVENTION

Figure 1:
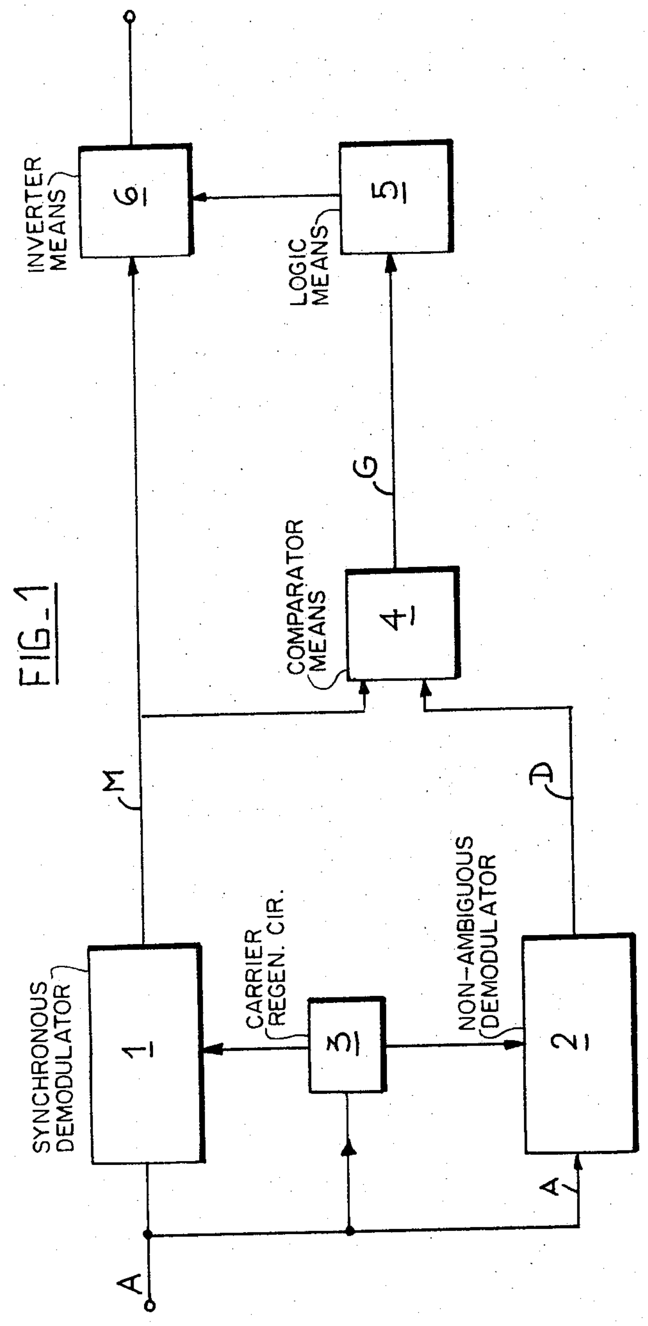
FIG. 1 is a schematic drawing of the arrangement according to the invention.

Referring to FIG. 1, there is shown a block diagram of the anti-ambiguity arrangement of the invention. The incoming PSK binary signal A is applied to the conventional synchronous demodulator 1 and to a so-called non-ambiguous demodulator 2 according to the invention. Said non-ambiguous demodulator 2 is allowed to have an output signal-to-noise ratio less than that of synchronous demodulator 1 and, more generally, it may have less precisely defined performance than are usually required from a conventional demodulator. Demodulators 1 and 2 are associated in a known manner to carrier regenerating circuit means 3. The outputs M and D from both demodulators are signals representative of the original message. These signals are coupled respectively to a first and second input of comparator means 4 adapted to produce a signal G having a first state when both inputs thereto are in phase and having a second state when the two inputs are in phase opposition. Logic means 5 then detects the sign of signal G and produces a signal to control the inverter means 6. When signal G is positive, the demodulated message signal M is transmitted just as it is and when said signal G is negative, the inverter 6 transmits the complement of demodulated signal M.

Figure 2:
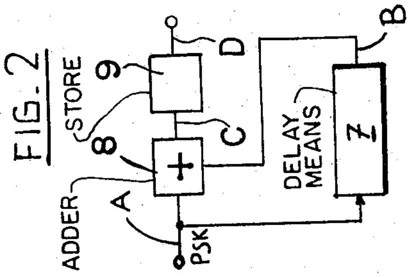
FIG. 2 is a simplified circuit drawing of a so-called non-ambiguous demodulator according to the invention.
Figure 3:
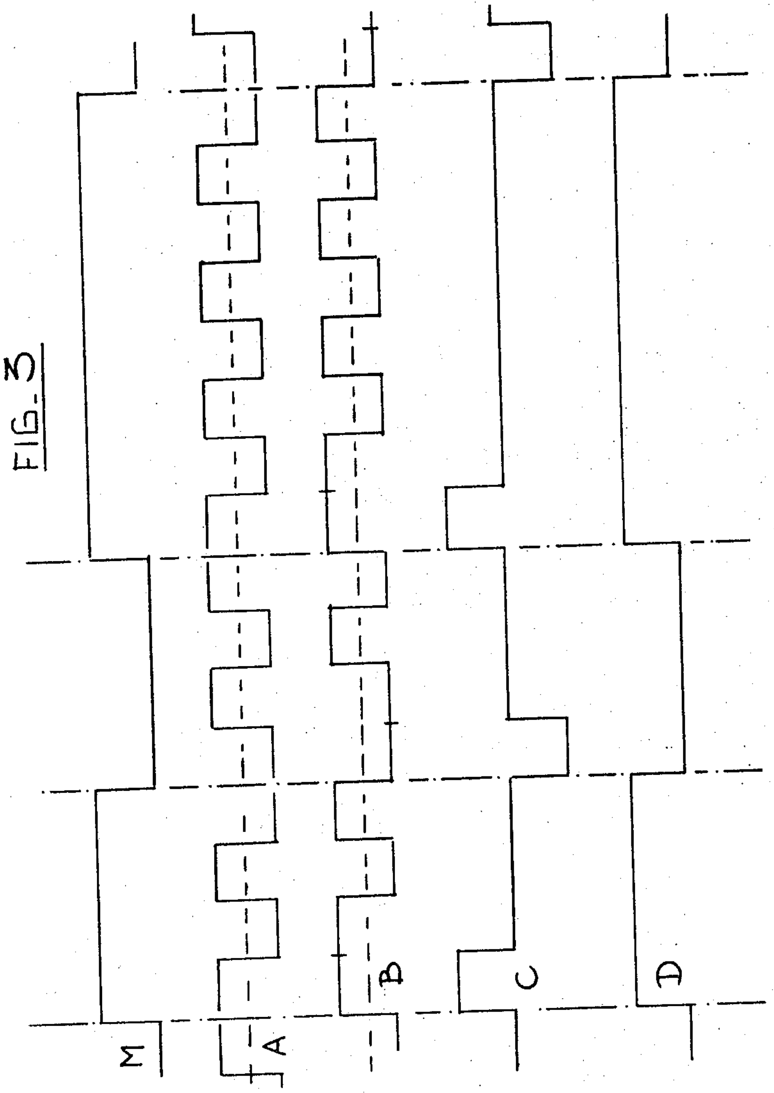
FIG. 3 is a pulse diagram depicting signals at various points in the circuit of FIG. 1.

The so-called non-ambiguous demodulator 2 according to the invention comprises, as illustrated in FIG. 2, delay means 7 such as a shift register adapted to provide a delay equal to half the carrier period. The PSK binary signal A and the delayed signal B are each coupled to an input of an adder 8 which produces a positive pulse when both signals A and B are at high level, a negative pulse when both signals A and B are at low level, and a zero when signals A and B have different levels. FIG. 3 shows the signals obtained with a PSK binary signal A corresponding to an exemplary message signal M. As it is well known in the art, the phase of binary signal A is reversed at each transition of the message signal M. The signal B is identical to signal A, but delayed by half a period. The output signal C from adder 8 comprises positive and negative pulses when signals A and B have the same phase as indicated above.

A store means 9 stores the state of each output pulse C from the adder 8 until occurrence of the next pulse. The output signal from said store means 9 then is a signal D which reproduces the message M as shown in FIG. 3.

Figure 4:
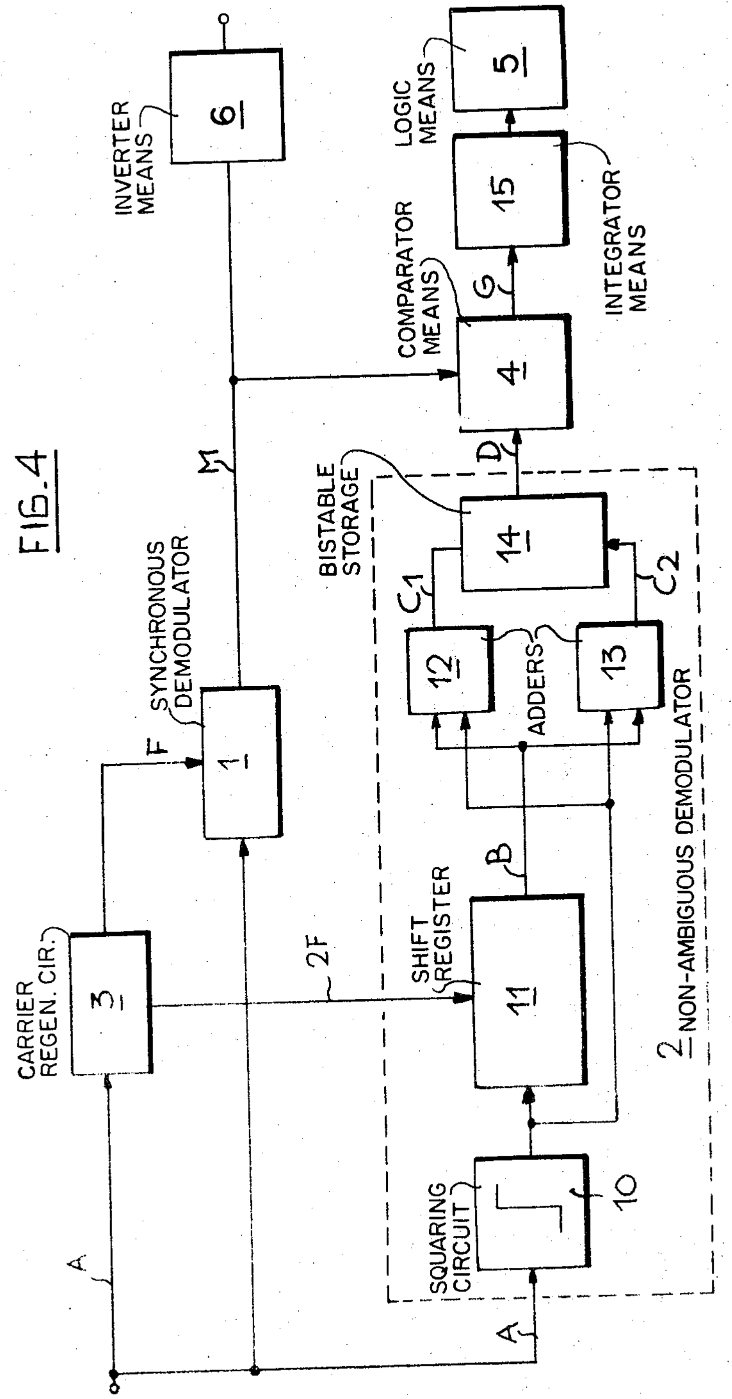
FIG. 4 is a schematic drawing of an embodiment of the arrangement of FIG. 1.

In FIG. 4 there is shown a block schematic of an embodiment of the arrangement of the invention, wherein the non-ambiguous demodulator 2 is in fully digital form. Like in FIG. 1 this arrangement comprises a conventional synchronous demodulator 1 and a non-ambiguous demodulator 2 both associated with a carrier regenerating circuit means 3, comparator means 4, logic means 5 and inverter means 6. The non-ambigous demodulator 2 includes a squaring circuit 10 serially connected with a shift register 11 providing a delay equal to half the carrier period. Said shift register is controlled by a signal 2F having a frequency equal to twice the carrier frequency. The output signal from shift register 11 is coupled to a first input of adders 12 and 13 which also accept the non-delayed input signal at a second input thereto. The outputs from adders 12 and 13 are connected each to an input to bistable store device 14. The output from the latter provides the reproduced original message D.

Means 4, 5 and 6 on FIG. 4 are similar to the corresponding ones on FIG. 1. At the output of comparator means 4 comprising for instance an exclusive-OR gate is connected integrator means 15 serving to reduce the amount of noise (primarily due to demodulator 2) superimposed to D.C. signal. The integration time constant directly affects the system performance. Indeed it determines the time required for the correction to be achieved after a variation of the output from means 4 has occurred and, in the presence of adding noises, it determines the rate at which false corrections due to noise occur, that is the rate at which the demodulated message M is erronously complemented or reversed.

Figure 5:
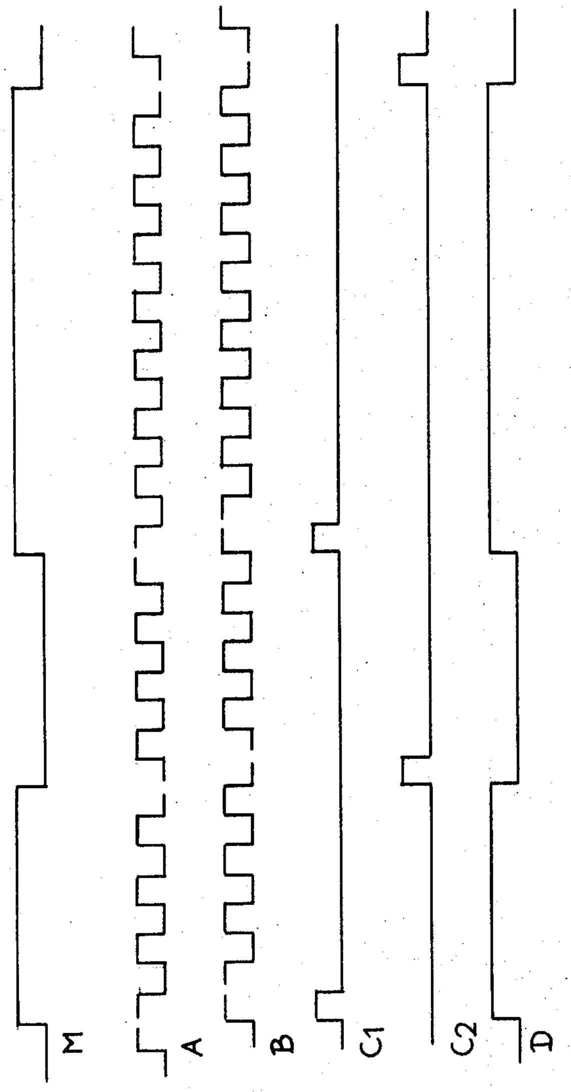
FIG. 5 is a pulse diagram depicting signals at various points in the circuit of FIG. 4.

The arrangement of FIG. 4 operates exactly in the same way as that of FIG. 1 and the signals at various points thereof are depicted in the diagram of FIG. 5. These signals are identical to those on FIG. 3 except that the two types of pulses comprising the output signal C from the adder are produced by circuit means 12 and 13 respectively and are applied to two separate lines. In this case, illustrative pulses $C_1$ and $C_2$ are shown to be all positive. Signal D reproduces the original message M.

It is seen that the arrangement according to the invention only needs to be fed by the incoming binary signal and a signal having a frequency that is twice the carrier frequency. Such a double frequency can readily be derived from the carrier regenerating circuit means.

Figure 6:
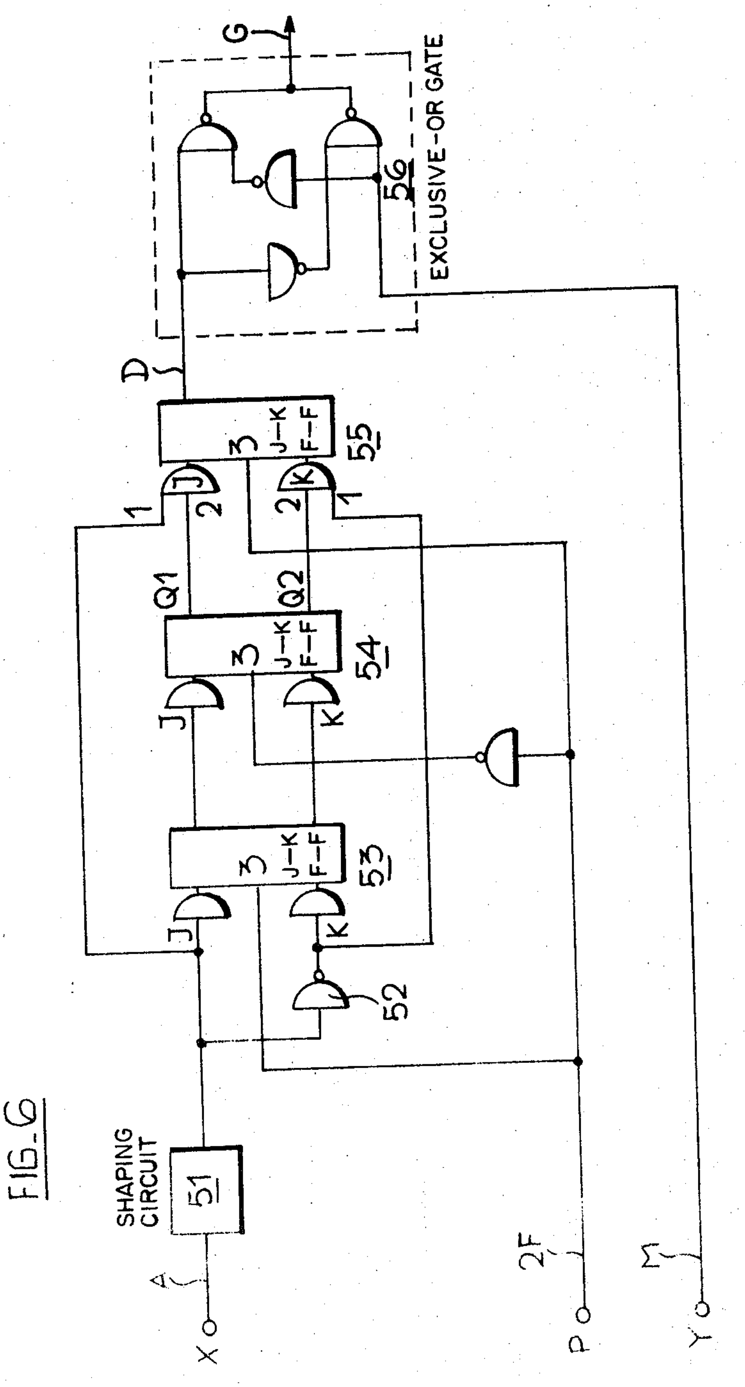
FIG. 6 is a circuit drawing of a particular embodiment of the non-ambiguous demodulator of the invention.

FIG. 6 depicts a particular embodiment of the non-ambiguous demodulator of the invention. The input binary signal is coupled from input terminal X to the input of shaping circuit means 51. Two J-K flip-flops 53 and 54 are arranged in a well-known shift register configuration. The J-input of flip-flop 53 is connected to the output of shaping means 51 and the K-input thereof also is connected to said shaper output through inverter means 52. The shift register 53, 54, on the one hand, accepts the incoming binary signal and, on the other hand, the complement thereof. The third inputs to each of flip-flops 53 and 54 accept a signal 2F having a frequency which is twice the carrier frequency F that is available at terminal P and derived from the carrier regenerating circuitry. Each of the outputs $Q_1$ and $Q_2$ from flip-flop 54 is connected to a respective input of flip-flop 55 which serves both as an adder and a store element, thereby performing the functions of means 12, 13 and 14 in the circuit of FIG. 4. Each of the J and K-inputs of flip-flop 55 is in effect an AND-gate designated as J and K respectively, having a first input 1 connected to a respective input of flip-flop 53 and a second input 2 connected to a respective output of flip-flop 54. Gate J compares the incoming signal A with that same signal delayed by half the carrier period, as explained above, and gate K compares the complement of signal A with that same complement delayed by half the carrier period. The output from flip-flop 55 provides the reproduced message D.

FIG. 6 also shows a particular embodiment for comparator means 4 on FIGS. 1 and 4. This embodiment comprises an exclusive-OR gate or modulo-2 adder 56 connected at the non-ambiguous demodulator output. Gate 56 compares the reproduced message D from flip-flop 55 with the message M from the synchronous demodulator (terminal Y on FIG. 6). When said two signals are in phase, the output signal G from gate 56 is at high level and when said two signals are in phase opposition, the output signal G is at low level. With the two binary levels being designated by 0 and 1 as is conventional in the art, it is seen that when both signals D and M are either 1 or 0, signal G is 1 and when one of said signals D and M is 0 and the other 1, signal G is 0.

An operational amplifier can be connected at the output of gate 56 to provide for integration function as indicated above, thereby to reduce the amount of noise superimposed to the signal. The integration time constant is adjusted while taking account of the saturation voltage of the amplifier and of the potential deviation between the high and low levels of the output signal from gate 56.

The logic means 5 can comprise a zero-crossing detector to detect the state of signal G and to control the inverter means 6 as explained above in order to reverse or complement the demodulated message M at the synchronous demodulator output when said state of signal G is low.

It is to be understood that the illustrative embodiment described in the foregoing is nowise limitative and that various types of logic gates can be used and readily arranged by one skilled in the art to perform the required functions in the arrangement of the invention.

What is claimed is:

1. A circuit arrangement for eliminating the phase ambiguity at a receive terminal in phase-shift keying binary transmission systems, comprising a carrier regenerating circuit means to regenerate the carrier from the received binary signal, a first synchronous demodulator means to reproduce the original message from the received binary signal by demodulation thereof with the regenerated carrier, a second non-ambiguous demodulator means accepting the received binary signal at a first input thereof and the regenerated carrier at a second input thereof to reproduce the original message, comparator means having a first input connected at the output of said first demodulator means and a second input connected at the output of said second demodulator means, said comparator means producing a signal having a first predetermined state when both inputs thereto are in phase and having a second predetermined state when both inputs thereto are in phase opposition, logic means connected to the output of said comparator means to detect the state of the output signal from the latter, thereby to produce a control signal when the output signal from said comparator means is of said predetermined second state, and inverter means connected to the output of said first demodulator means to reverse the demodulated message from said first demodulator means in response to said control signal.

2. A circuit arrangement as claimed in claim 1, wherein said second demodulator means comprises delay means accepting the incoming binary signal at a first input thereof and a signal having a frequency equal to twice the carrier frequency at a second input thereof to provide a delay equal to half the carrier period, adder means having a first input to accept said incoming binary signal and a second input connected to the output of said delay means, said adder means producing a pulse having a first type when both inputs thereto have a same first state, a pulse having a second type when both inputs thereto have a same second state and no pulse when the two inputs thereto have different states, and store means connected to the output of said adder means to store the state of a pulse applied at any one of the inputs thereto until the occurrence of any next input pulse, thereby to produce a signal which reproduces the original message.

3. A circuit arrangement as claimed in claim 2, wherein said second demodulator means comprises an input shaping circuit means, wherein said delay means comprises a shift register means, connected to the output of said shaping circuit means and controlled by said signal having a frequency which is twice the carrier frequency, and wherein said adder means comprises means to generate a positive pulse when both inputs thereto are at a high level, a negative pulse when both inputs thereto are at a low level, and no pulse when the two inputs thereto are at different levels.

4. A circuit arrangement as claimed in claim 2, wherein said second demodulator means comprises an input shaping circuit means, wherein said delay means comprises shift register means controlled by said signal having a frequency which is twice the carrier frequency, a first input of said shift register means being adapted to accept the binary signal from said shaping circuit means while a second input is adapted to have applied thereto the complement of said binary signal, wherein said adder means comprises two coincidence gates each having a first input connected to a respective output from said shift register means and a second input connected to the corresponding input of said shift register means, and wherein said store means comprises a bistable device having the two inputs thereof connected to the respective outputs from said two coincidence gates.

5. A circuit arrangement as claimed in claim 1, further comprising integrator means connected between said comparator means and said logic means.

* * * * *